United States Patent [19]

Jones

[11] Patent Number: 4,907,881
[45] Date of Patent: Mar. 13, 1990

[54] PRECISION ALIGNMENT DEVICE

[75] Inventor: Nelson E. Jones, Huntington Beach, Calif.

[73] Assignee: The United States of America as represented by the United States Department of Energy, Washington, D.C.

[21] Appl. No.: 166,582

[22] Filed: Mar. 10, 1988

[51] Int. Cl.⁴ .................. G01B 11/26; G02F 1/03
[52] U.S. Cl. .................. 356/152; 356/138; 356/399; 356/400; 33/263; 33/276; 33/286; 350/356
[58] Field of Search .............. 356/141, 152, 138, 150, 356/399, 400; 350/355, 356; 33/263, 266, 276, 286

[56] References Cited

U.S. PATENT DOCUMENTS

| | | | |
|---|---|---|---|
| 3,558,896 | 1/1971 | Daly | 356/152 X |
| 3,603,691 | 9/1971 | Hamilton | 356/152 |
| 3,942,894 | 3/1976 | Maier | 356/138 X |
| 4,146,329 | 3/1979 | King et al. | 356/152 |
| 4,191,207 | 3/1980 | Jacobi et al. | 356/400 X |
| 4,576,480 | 3/1986 | Travis | 356/152 |
| 4,618,759 | 10/1986 | Müller et al. | 356/152 X |
| 4,627,725 | 12/1986 | Nishio et al. | 356/152 |
| 4,671,654 | 6/1987 | Miyahara et al. | 356/152 |
| 4,675,501 | 6/1987 | Klingel | 219/121 |
| 4,738,531 | 4/1988 | Lloyd et al. | 356/152 |
| 4,761,749 | 8/1988 | Titsworth et al. | 356/152 X |
| 4,789,228 | 12/1988 | Le Pesant et al. | 350/355 |

Primary Examiner—Stephen C. Buczinski
Assistant Examiner—Linda J. Wallace
Attorney, Agent, or Firm—Milton D. Wyrick; Paul D. Gaetjens; William R. Moser

[57] ABSTRACT

Apparatus for providing automatic alignment of beam devices having an associated structure for directing, collimating, focusing, reflecting, or otherwise modifying the main beam. A reference laser is attached to the structure enclosing the main beam producing apparatus and produces a reference beam substantially parallel to the main beam. Detector modules containing optical switching devices and optical detectors are positioned in the path of the reference beam and are effective to produce an electrical output indicative of the alignment of the main beam. This electrical output drives servomotor operated adjustment screws to adjust the position of elements of the structure associated with the main beam to maintain alignment of the main beam.

8 Claims, 5 Drawing Sheets

PRECISION ALIGNMENT DEVICE

The invention is the result of a contract with the Department of Energy (Contract No. W-7405-ENG-36).

BACKGROUND OF THE INVENTION

This invention relates generally to the precise alignment of beams and, more specifically to devices for the precise alignment of particle accelerators, lasers, optical systems, or other beam producing apparatus.

Beam producing apparatus, such as particle accelerators, lasers, optical systems and the like, often is connected to an associated structure, which may contain an assembly of such things as lenses, collimators, beam splitters magnets, or any other equipment intended to control, direct, or otherwise modify the beam. Precise alignment of this associated structure is essential if the beam producing apparatus is to perform its intended function.

Although initial alignment of the structure may be readily accomplished manually with removable targets, maintaining this alignment over an extended period of operation can be difficult, depending upon the environment in which the beam apparatus is deployed. Pressure, temperature, radiation, or other environmental changes during operation can adversely affect the structural members associated with the beam producing apparatus, causing misalignment of the path of the beam.

When beam producing devices are employed in a laboratory, or a manned, ground location, realignment to correct any deviation of the structure can normally be easily accomplished by either mechanical or manual means. Actually, because environmental conditions in these settings are often controlled, realignment is not often necessary. However, beam producing devices are being deployed in increasing numbers in more hostile environments, such as at remote earth locations and in space. In these more hostile locations, which may even be unmanned manual realignment may not be possible, although frequent readjustment of the associated structure may be required because of the particular nature of the environment. These locations dictate the use of automatic alignment systems to maintain the beam producing device in proper alignment during and after an environmental perturbation.

Various types of automatic alignment systems have been used in the past, many utilizing sensors to control movement of the mirrors which directed the beam. In some cases, these sensors were quad-cell detectors placed in the path of an adjacent laser beam to detect misalignment. However, as quad-cell detectors necessarily intercept this beam, causing high energy losses, they cannot be directly employed in a series configuration to control multiple sections of a beam directing structure. Therefore, any such use must be carefully engineered.

In some applications it may be possible to mechanically insert a quad-cell detector temporarily into the path of the beam to determine its alignment. However, precise alignment requires that the detector be accurately located at exactly the same location with respect to the surrounding structure upon each insertion. Such accuracy is difficult to attain even in manned, ground locations, and is essentially impossible in the environment of space. Mechanical placement of sensors in the path of the main beam is therefore not an acceptable design choice.

Quad-cell detectors are, however, useful devices when properly utilized. These devices contain an array of photodetecting material deposited on a substrate in four separated quadrants. The electrical output from each quadrant is proportionate to the quantity of light energy incident to its surface. When the light is striking the central area of the surface, all four outputs are equal. This electrical output is connected to differential amplifiers which can in turn operate electromechanical positioning devices. Quad-cell detectors are generally commercially available.

In use, should the light move from the central area of the detector, the quadrant or quadrants receiving the light would produce a voltage signal proportional to the energy incident to each quadrant which, when used in conjunction with a differential amplifier, can effect realignment of the beam or its associated structure. However, as previously stated, care must be taken in their use because quad-cell detectors intercept the laser beam.

A method of alignment of a high power laser is disclosed in U.S. Pat. No. 4,146,329 to King, et al. This alignment system utilizes a separate reference laser which propagates coaxially with an annular main laser beam until it is extracted. This extracted reference beam acts as an incident beam to a null position sensor, such as a quad-cell detector. The quad-cell generates an electrical error signal should the reference beam move from the null position. This error signal is used by servo-electronics to reposition a mirror until realignment is achieved.

As explained in the patent, the HeNe reference laser must be securely affixed to the bench supporting the main laser, and should be enclosed in a temperature controlled environment to maintain the stability necessary for this application. These requirements would be very difficult to achieve in a hostile environment.

An automatic alignment system using detectors in the path of a main laser beam is disclosed in U.S. Pat. No. 4,675,501 to Klingel. In this case, the detectors have a central aperture through which the main beam passes when properly in alignment. Mirrors used to direct the main beam are angularly repositioned in response to electrical signals from the detectors when a portion of the beam strikes the detector surrounding the aperture, indicating misalignment. A serious problem with this configuration, as stated in the patent, is that the detectors could be damaged by a major misalignment of the beam.

Neither of these patents provide any teachings of apparatus or method for maintaining the alignment of beam modifying structures. The prior art provides little guidance for accomplishing this function, although the deployment of beam producing apparatus utilizing associated structures is on the increase.

It is therefore an object of the present invention to provide apparatus for precisely maintaining the alignment of beams through control of the associated structure.

It is a further object of the present invention to provide a system for aligning beams which operates automatically.

It is a still further object of the invention to provide system capable of controlling a structure having multiple segments.

It is a still further object of the invention to provide an automatic alignment system which will operate reliably in an environment hostile to the maintenance of alignment of the structure associated with a main beam.

It is a still further object of the present invention to provide an automatic beam alignment system employing a series plurality of reference beam detecting stations without introducing significant losses of the reference beam.

SUMMARY OF THE INVENTION

To achieve the foregoing and other objects, and in accordance with the purposes of the present invention, as embodied and broadly described herein, apparatus for providing precision alignment of beam devices may comprise a reference beam laser attached to the structure associated with the main beam. Optical switches capable of selectively diverting at least a portion of the reference beam angularly to a new path are disposed in the path of the reference beam. Optical detectors are located in the path of the angularly diverted reference beam and output an electrical signal related to any misalignment of the reference beam. Adjustment apparatus operatively connected to the structure receives the electrical signal and returns the structure to proper alignment.

In a further aspect of the present invention, and in accordance with its objects and purposes, a method of maintaining the alignment of initially aligned structures for directing, collimating, focusing, reflecting or otherwise modifying a main beam along a path, the steps of producing a reference beam along a first path substantially parallel to the path of the main beam; diverting at least a portion of the reference beam angularly to a second path; detecting the reference beam with detectors in the second path, the detectors outputting an electrical signal indicative of the misalignment of the main beam; and adjusting the associated structure in response to the electrical signal received from the detectors so that the structure returns the main beam to proper alignment.

BRIEF DESCRIpTION OF THE DRAWINGS

The accompanying drawings, which are incorporated in and form a part of the specification, illustrate the embodiment of the present invention and, together with the description, serve to explain the three principles of the invention. In the drawings.

DETAILED DESCRIPTION

Figure 1:
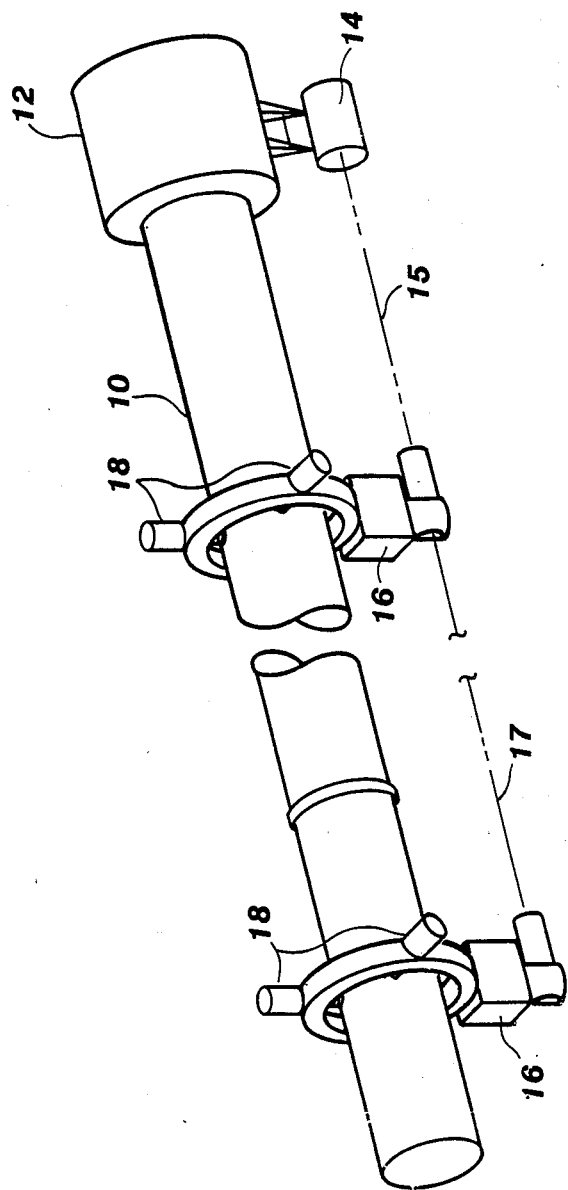
FIG. 1 is an overall assembly drawing of one embodiment of a main beam generating apparatus with an associated structure for modifying the beam with the reference laser, detectors, and adjusting screws according to the present invention.

One embodiment of the present invention is illustrated in FIG. 1, where a main beam generating apparatus 12 is shown attached to structure 10. Structure 10 may contain such elements (not shown) as lenses, mirrors, collimators, beamsplitters, and magnets for directing, collimating, focusing, reflecting or otherwise modifying the beam produced by main beam generating apparatus 12. Reference laser 14 is attached to main beam generating apparatus 12 at a stable point, and produces a reference laser beam 15 generally parallel with the beam produced by main beam generating apparatus 12.

Reference laser 14 can be any laser capable of assuredly performing in a particular environment. For laboratory, industrial, and many other ground applications, a commercially available Helium-Neon (HeNe) laser would be appropriate. For space applications, a space-qualified laser, such as a solid-state laser, could also be used. Of course, it is important that the laser be adaptable to mounting to main beam generating apparatus 12.

As indicated in FIG. 1, structure 10 may be segmented in telescopic or other configurations. Because of temperature, pressure, or other environmental changes, the alignment of these segments may be altered, causing misdirection of path of the beam from main beam generating apparatus 12. The purpose of the present invention is to correct such misdirections by automatically returning the affected segments of structure 10 to a correctly aligned state.

To accomplish this realignment, detector modules 16 are located along structure 10 at points where alignment is considered critical. Detector modules 16 are positioned so that reference laser beam 15 can pass through a port in its body, and either be diverted to the interior of detector module 16, or passed directly through to a subsequent detector module 16.

Adjustment screws 18 are also located along structure 10 at points near their associated detector modules 16. The only requirement for the relationship between each adjustment screws 18 is that each one be substantially orthogonal to its adjacent adjustment screws 18. Adjustment screws 18 may be of numerous designs which will be effective to physically adjust the position of a segment of structure 10 in response to an electrical signal originating with detector modules 16. One possible configuration is an electromechanical servomotor driving a jack screw in response to the electrical output from a differential amplifier (not illustrated) associated with a detector module 16. The specific design would depend on the particular application, and adjustment screws 18 could as well be mechanically, pneumatically or hydraulically driven.

It should be understood that throughout this application the terms, horizontal and vertical, will be used to refer to certain components of the invention. This use is for convenience in identifying the components as they appear in the figures. Such use of the terms, horizontal and vertical, is not to be construed as in any way limiting the actual positioning of the components, as many are susceptible to other positioning.

Figure 2:
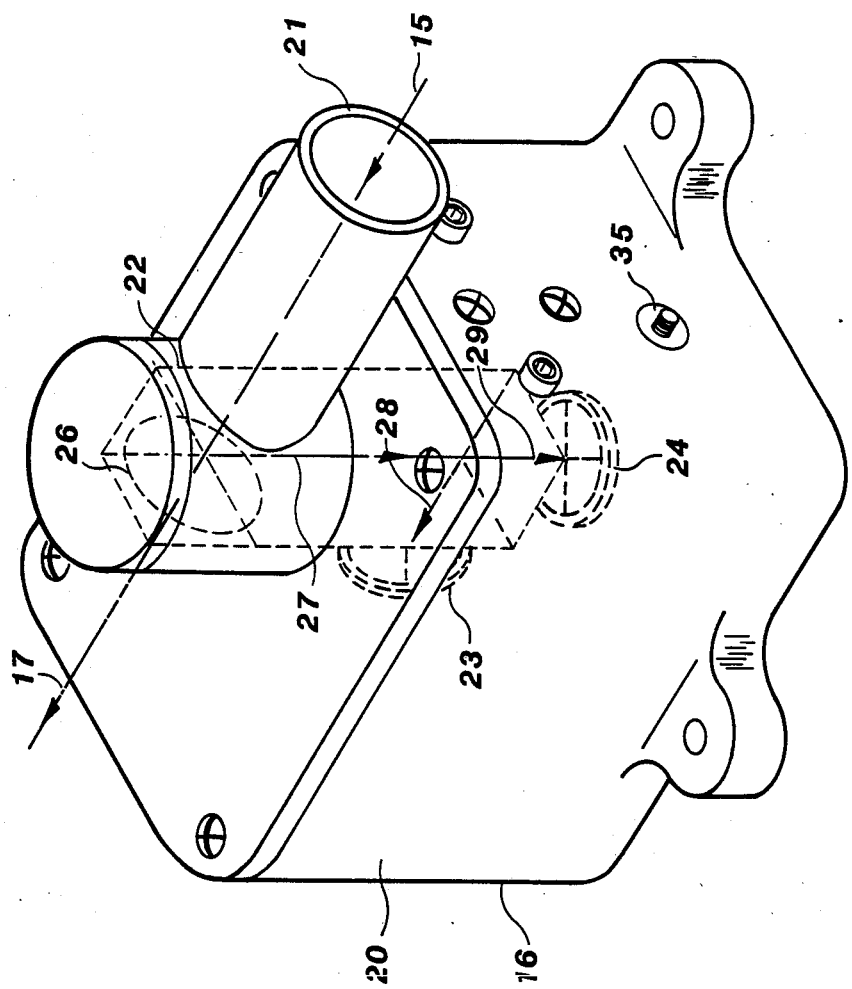
FIG. 2 is a modified view of a detector module according to an embodiment of the present invention with the principle internal components, the prism assembly and horizontal and vertical detectors, as well as the reference laser beams, shown by broken lines.
Figure 3:
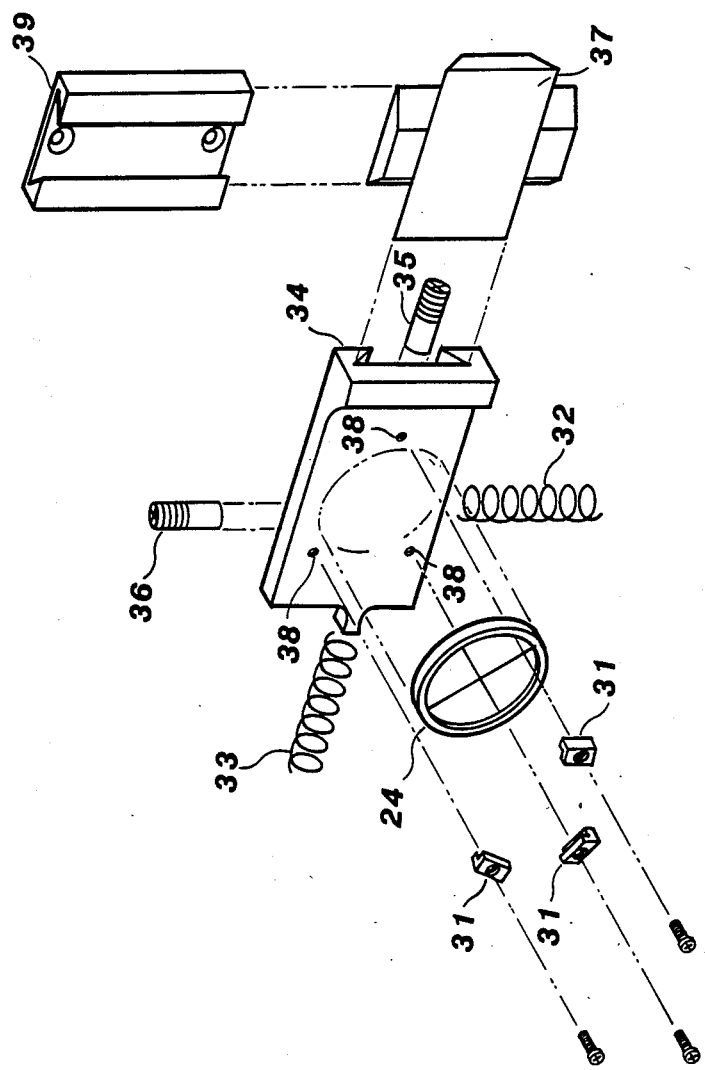
FIG. 3 is an exploded perspective view of the mounting of a horizontal detector according to the present invention.

Referring now to FIG. 2, there is seen a perspective view of a detector module 16 with its internal components indicated by broken lines. As shown in the drawing, body 20 encloses a prism assembly 22, which is a stacked combination of two prism assemblies, vertical detector 23 and horizontal detector 24. Horizontal locater screw 35, which is shown in greater detail in FIG. 3, is indicated as extending through body 20.

Although two detectors (vertical detector 23 and horizontal detector 24) are shown in FIG. 2, it should be understood that only one detector is required to control a set of adjustment screws 18. The second detector represents a redundant detector that could be selected should some failure associated with the first detector occur.

In operation, reference laser beam 15 enters body 20 through stray light shield 21 and may pass on through port 26, or have at least a portion of its energy diverted into the interior of body 20 by prism assembly 22. The diverted portion of reference laser beam 15 is designated first deflected reference beam 27 and can be diverted conveniently at an angle of 90°, although any other angle may be employed as long as beam 27 is orthogonally incident to horizontal detector 24. If desired, beam 27 may be further divided by the lower prism assembly in the stacked combination into second deflected laser beam 28, which is orthogonally incident to vertical detector 23. The undiverted portion of beam 15, if any, continues to a subsequent detector 16 as beam 17.

Horizontal detector 24 and vertical detector 23 may take the form of quad-cell detectors, although any detector capable of producing an electrical output indicative of the position of a light beam on its surface could also be employed. In this embodiment, both a vertical detector 23 and a horizontal detector 24 are used to provide redundancy although some applications might require only one detector. The outputs of detectors 23 and 24 are connected to differential amplifiers (not shown) whose outputs are used by adjustment screws 18 to adjust the position of segments of structure 10.

Prism assembly 22 may be either a stacked combination of two beam splitters or a stacked combination of two liquid dielectric optical switches (Lidos) manufactured by Thompson-CSF. Of course, only one of these devices would be necessary if only horizontal detector 24 were to be employed.

A beam splitter divides an incident light beam into two parts, passing a portion of the beam directly through its body, while diverting the remainder at a 90° angle. In the embodiment of FIG. 2, the upper beam splitter would pass a portion of reference laser beam through port 26, and divert the remainder as beam 27, which would be the incident beam to the lower beam splitter of prism assembly 22. The lower beam splitter would further divide beam 27 into beam 28, incident to vertical detector 23.

Alternatively, prism apparatus 22 could comprise two liquid dielectric optical switches (Lidos). Each of these switches comprises two prisms of equal refractive indices, having their hypotenuses parallel and spaced apart a distance of 10 to 30 microns. This gap between the prisms contains a droplet of dielectric fluid, having a refractive index equal to the index of the prisms, which can be moved along the gap between two transparent electrodes upon the application of a voltage. When the central area of the gap is free of the fluid, light incident to the first prism would be reflected at an angle of 90° by the back of the first prism. When, however, the fluid is moved to the central area of the gap, light passes directly through to the second prism and is output with negligible loss because of the identical refractive indices.

Use of Lidos switches as prism assembly 22 in FIG. 2 would provide the same general function as beamsplitters with far less loss. However, with Lidos, there are two states: one with reference beam 15 being totally diverted to the interior of detector modules 16; and the other with reference beam 15 being passed directly through port 26 to a succeeding detector module 16. The lower Lidos switch, if used, would likewise pass incoming light to either vertical detector 23 or to horizontal detector 24. As discussed above, switching between the two states is accomplished through the application of a voltage to the transparent electrodes, which can be controlled by external electronics (not shown).

Figure 4:
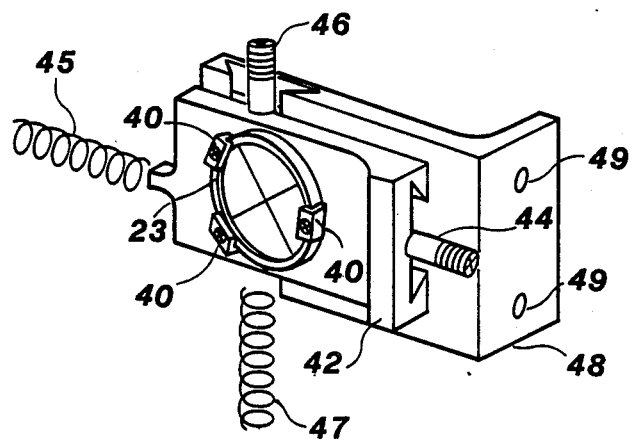
FIG. 4 is a perspective view of a mounted vertical detector according to the present invention.

The structures supporting vertical detector 23 and horizontal detector 24 can best be understood by reference to FIGS. 3 and 4. Referring first to FIG. 3, there can be seen an exploded perspective view of the supporting structure of horizontal detector 24. As shown, horizontal detector 24 is attached to detector slide 34 by bolts and clamps 31 so that its opposite quadrants are aligned with the corresponding adjustment screws 18 (FIG. 1).

Another embodiment of prism assembly 22 would be the use of a Lidos switch as the upper prism and a beam splitter in the lower position. This would provide the benefits of low loss for transmission of reference beam 15, as well as simultaneous incident light to vertical detector 23 and horizontal detector 24 when the Lidos switch is diverting reference beam 15 into the interior of detector module 16.

Adjustment of the position of horizontal detector 24 (and horizontal slide 34) is allowed by their sliding engagement with the horizontal member of detector slide 37, which in turn has its vertical member slidingly engaged with a vertical angled slot in support bracket 39. Screw holes 38 allow support bracket 39 to be secured to body 20 (FIG. 2) with screws.

Movement of the detector slide 34, with horizontal detector 24 attached) is accomplished through locator screws 35, 36 which extend through body 20. The action of locator screws 35, 36 is resisted by reaction springs 32, 33, and serves to allow the nulling of the output of detector 24, during initial alignment and set up, by centering the position of the incident beam 29 (FIG. 2) on detector 24. Springs 32, 33 urge detector slide 34 against locator screws 35, 36, and minimize vibration induced "jitter" of detector 24.

Referring now to FIG. 4, it can be seen that vertical detector 23 is mounted in a manner similar to that of horizontal detector 24. As shown, vertical detector 23 is fixed to detector slide 42 by bolts and clamps 40 so that its opposite quadrants are aligned with the position of the corresponding adjustment screws 18 (FIG. 1). Detector slide 42 matingly engages the horizontal portion of detector cross slide 43, which is mostly hidden in FIG. 4 by slide 42, but which is identical to cross slide 37 (FIG. 2). The vertical portion of cross slide 43 matingly engages a vertical angled slot in detector support bracket 48. These mating horizontal and vertical members allow vertical detector 23 to be moved by locator screws 44, 46, against reaction springs 45, 47 respectively. The vertical detector 23 assembly is attached to body 20 (FIG. 2) through screw holes 49.

Figure 5:
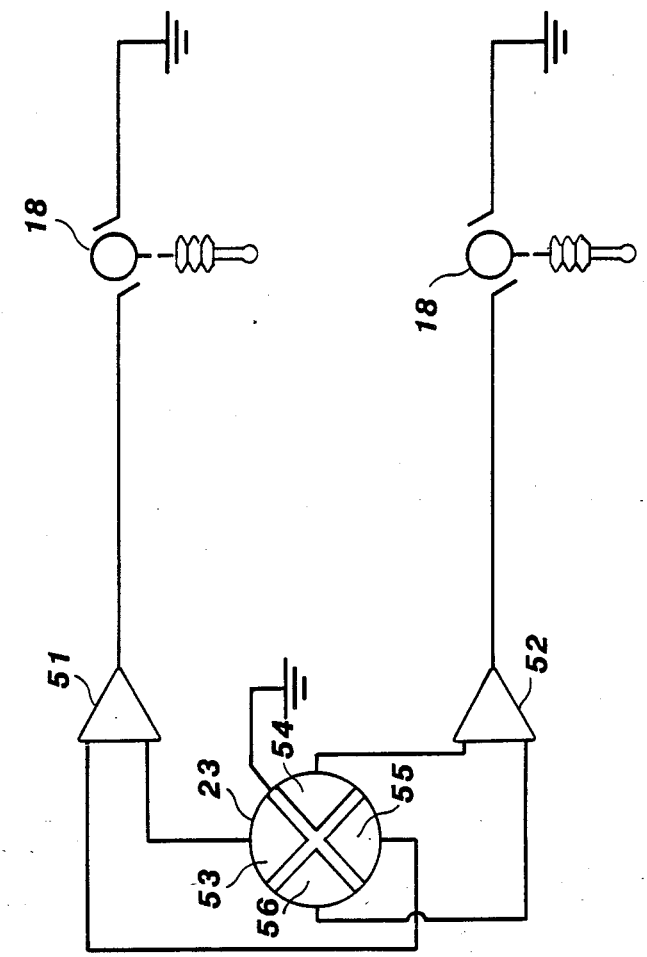
FIG. 5 is a block diagram illustrating the electrical connections between the detectors, differential amplifiers, and the adjustment screws.

A block diagram of the electrical connections of vertical detector 23 and its associated adjustment screws 18, according to an embodiment of the present invention, is illustrated in FIG. 5. As shown, vertical detector 23 contains upper quadrant 53, lower quadrant 55, right quadrant 54, and left quadrant 56. Quadrants 53, 55 are aligned with the movement axis of the vertical adjustment screws, and quadrants 54, 56 are aligned with the horizontal adjustment screws 18.

For control of the vertical adjustment screw 18, upper quadrant 53 and lower quadrant 55 are connected to vertical differential amplifier 51, whose output is connected to the vertical adjustment screw 18. Correspondingly, right quadrant 54 and left quadrant 56 are connected to horizontal differential amplifier 52, whose output is connected to the horizontal adjustment screw 18.

Again, it should be understood that throughout this application, the terms, horizontal and vertical, as used to refer to certain components of this invention, are used for convenience only, and are not to be construed as limiting. It is preferable, however that each adjustment screws 18 be orthogonally located with respect to its adjacent adjustment screws 18.

Operation of the precision alignment device can be best understood by referring back to FIG. 1. Initially, the main beam apparatus 10 is manually aligned utilizing adjustment screws 18 in a manual mode until the entire structure 10 is properly aligned.

After manual alignment of structure 10 is accomplished, reference laser 14 is activated, and produces reference beam 15. Beginning with the detector module 16 farthest away from reference laser 14, vertical detectors 23 (FIG. 2) are adjusted with locator screws 44, 46 (FIG. 4), and horizontal detectors 24 (FIG. 2) are adjusted with locator screws 35, 36 (FIG. 3), until a null output from each detector is achieved. This null output from detectors 23, 24 (FIG. 2), is now indicative of a correctly aligned structure 10, and the outputs of the detectors 23, 24, can then be connected to adjustment screws 18, and the entire unit deployed to its remote location.

In that remote location, the effects of temperature, pressure, or radiation may cause one or more segments of structure 10 to move, causing misalignment of main beam 15. However, the movement of the segment would also cause a detector module 16 associated therewith to output a signal because incident beam 28 (FIG. 2) on vertical detector 23 (FIG. 2), and the incident beam 27 (FIG. 2) on horizontal detector 24 (FIG. 2), would no longer be in the null output position. The output from detector module 16 would be connected to associated differential amplifier 53 (FIG. 5), whose output would be connected to the associated adjustment screws 18, causing them to operate and return the affected segment or segments of structure 10 to their proper, aligned position.

Vertical detector 23 and horizontal detector 24, shown in FIG. 2, may take the form of quad-cell detectors. Quad-cell detectors contain an array of photoconducting material deposited on a substrate in four, separated quadrants. As the output of each quadrant is directly proportional to the light incident on that quadrant, it can be used in conjunction with differential amplifiers 51, 52 to drive adjustment screws 18 which alter the position of structure 10 until the output from the quad-cell detector is again nulled. Quad-cell detectors are generally commercially available, and any high quality device would be acceptable for the present invention.

The foregoing description of embodiments of the present invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In apparatus for producing a main beam along a path through an initially aligned structure for directing, collimating, focusing, reflecting, or otherwise modifying said main beam, an automatic alignment system for said structure, comprising:
   laser means fixedly attached to said structure for providing a reference beam directed along a first path substantially parallel with said path of said main beam through said structure;
   one or more liquid dielectric optical switches disposed in said first path of said reference beam for diverting at least a portion of said reference beam to a second path;
   a plurality of quad cell detectors disposed in said second path of said reference beam for outputting electrical signals indicative of the departure of said structure from said initial alignment; and
   adjustment means contacting said structure and operatively connected to said detectors for altering the position of said structure in response to said electrical signals from said detectors, to return said structure to said initial alignment.

2. The apparatus as described in claim 1 further comprising:
   one or more beam splitters positioned so that said second path is received as input to each said beam splitter; and
   a plurality of quad-cell detectors arranged to receive incident outputs of said one or more beam splitters.

3. The apparatus as described in claim 1, wherein said one or more liquid dielectric optical switches comprises one or more pair of first and second liquid dielectric optical switches operatively connected so that said second path is outputted from each said first liquid dielectric optical switch and is received as input to each said second liquid dielectric optical switch.

4. The apparatus as described in claim 3, wherein said detectors comprises quad-cell detectors positioned to receive orthogonally incident outputs from said second liquid dielectric optical switch.

5. A method for maintaining alignment of an initially aligned structure for directing, collimating, focusing, reflecting, or otherwise modifying a main beam along a path, comprising the steps of:
   producing a laser beam along a first path parallel to the path of said main beam;
   diverting at least a portion of said reference beam angularly to a second path through one or more liquid dielectric optical switches;
   detecting said reference beam with quad-cell detectors located in said second path, said detectors outputting an electrical signal indicative of misalignment of said main beam; and
   adjusting said structure in response to said electrical signal received from said detectors so that said structure returns to the position of said initial alignment.

6. The method as described in claim 5, wherein said one or more liquid dielectric optical switches comprise one or more pair of first and second liquid dielectric optical switches operatively arranged so that said second path is output from said first liquid dielectric optical switch and received as input by said second liquid dielectric optical switch.

7. The method as described in claim 6, further comprising the step of receiving said second path of said reference beam and selectively diverting at least a portion of said second path to a third path, said second and third paths each being incident to said detectors.

8. The method as described in claim 5, wherein said at least a portion of said reference beam is diverted to a second path by a liquid dielectric optical switch operatively positioned so that said second path is received as input to a beam splitter.

* * * * *